Dec. 22, 1936.   H. ROLLBÜHLER ET AL   2,065,098
METHOD OF MAKING PLAQUETS FOR SPECTACLES OR EYEGLASSES
Filed May 6, 1935    2 Sheets-Sheet 1
Fig. 1
Fig. 3
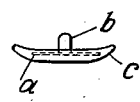
Fig. 2
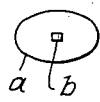
Fig. 4
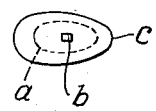
Fig. 5
Fig. 7
Fig. 9
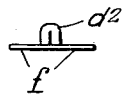
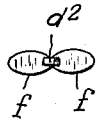
Fig. 6       Fig. 8       Fig. 10
Inventors:
Hans Rollbühler and
Walter Döbbelin.
By: Thomas H. West
Atty.

Dec. 22, 1936.   H. ROLLBÜHLER ET AL   2,065,098
METHOD OF MAKING PLAQUETS FOR SPECTACLES OR EYEGLASSES
Filed May 6, 1935   2 Sheets-Sheet 2

Inventors:
Hans Rollbühler and
Walter Döbbelin
By Thomas H. West
Atty.

Patented Dec. 22, 1936

2,065,098

UNITED STATES PATENT OFFICE 2,065,098

METHOD OF MAKING PLAQUETS FOR SPECTACLES OR EYE-GLASSES

Hans Rollbühler and Walter Döbbelin, Schwäbisch-Gmund, Germany, assignors to Ferdinand Menrad, Schwabisch-Gmund, Germany, a factory of Germany Application May 6, 1935, Serial No. 20,008
In Germany March 10, 1934

4 Claims. (Cl. 29—20)

Our invention relates to improvements in plaquets for spectacles or eye-glasses, and in the method of manufacturing the same, and the object of the improvements is to provide plaquets which may be manufactured at low cost and practically without waste of material. Another object of the improvements is to provide a method of manufacturing such plaquets in which the blank from which the plaquet is made is not injured at its surface. With these objects in view our invention consists in manufacturing the plaquet from a straight wire which is bent into the proper form and provided with the flat portions which are to be covered with a suitable pad or lining adapted to bear on the nose of the person.

For the purpose of explaining the invention the article has been illustrated in the successive steps of the manufacture in the accompanying drawings.

In the said drawings,

Fig. 1 is an elevation showing a plaquet of the construction now in use,

Fig. 2 is a top plan view of the plaquet shown in Fig. 1,

Fig. 3 is an elevation of the plaquet having a lining applied thereto,

Fig. 4 is a top plan view of the plaquet shown in Fig. 1,

Fig. 5 is an elevation of a blank bent from a wire by the first step of our improved method.

Fig. 6 is a top plan view of the blank shown in Fig. 5,

Figure 11:
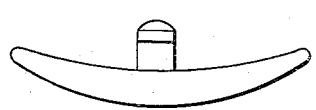
Figure 12:
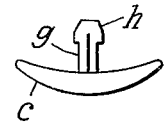
Figure 13:
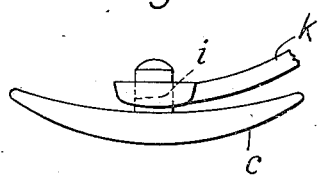
Figure 14:
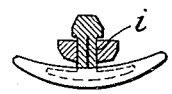
Figure 15:
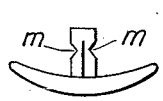
Figure 16:
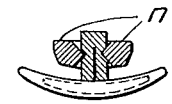

Fig. 7 is an elevation similar to the one illustrated in Fig. 5 and showing the second step of the method, Fig. 8 is a top plan view of the blank shown in Fig. 7, Fig. 9 is an elevation similar to the one illustrated in Fig. 5 and showing the last step of the method and the finished plaquet, the lining being omitted, Fig. 10 is a top plan view of the plaquet shown in Fig. 9, Fig. 11 is an enlarged elevation of the plaquet having the lining applied thereto, the stem of the said plaquet being formed with a head by means of which it is attached to the plaquet arm, Fig. 12 is a side elevation of the plaquet shown in Fig. 11, Fig. 13 is an elevation of the plaquet shown in Fig. 11, the said figure also showing a part of the arm or bracket carrying the plaquet, Fig. 14 is an elevation of the plaquet shown in Fig. 13 partly in section, Fig. 15 is a side elevation similar to the one illustrated in Fig. 12 and showing a modification, and Fig. 16 is an elevation partly in section showing the plaquet illustrated in Fig. 15 and the arm or bracket carrying the same.

In Figs. 1 to 4 we have illustrated a plaquet of the construction now in use. As is shown in the said figures, the plaquet comprises a flat substantially oval portion $a$ which is made integral with a stem $b$ by means of which the plaquet is mounted on an arm or bracket secured to or made integral with the bridge or the eye-wire of the spectacles or eye-glasses. As is shown in Figs. 3 and 4 the plaquet is provided with a lining $c$ of celluloid or other suitable material. A separate plaquet which has been attached to the bridge or eye-wire of the spectacles or eye-glasses is intended to be placed on each side of the nose. Heretofore the plaquet has been manufactured from a blank in the form of a short rod of rectangular cross-section, the flat portion being produced at one end of the blank by pressing, while the remaining portion of the rod was not deformed thus providing the stem. In this method the flat portion $a$ was made larger than was necessary in the plaquet, the excess being cut off after pressing, so that the flat portion had the desired size and shape. This method resulted in a considerable loss of material, the tools were subject to high stress and wear, and finally the blank itself was subject to injury, the gilding being spoiled by the pressing operation particularly at such parts which afterwards were not coated with celluloid or other material. The stem was frequently irregular in shape, and also the gilding thereof was frequently spoilt, and in some cases the overlays of gold were entirely removed at some parts, so that the metal was subject to the attack by perspiration.

In our improved method these objections are obviated by manufacturing the stem of the plaquet from a blank in the form of a wire, the said wire being first formed with a double bend at its middle thus producing the stem from the median bent portion, and afterwards the flat portion is made by pressing the ends of the wire.

By our improved process plaquets of uniform shape are produced, and more particularly the stem and flat portions are connected with each other in the proper way.

Further, our invention consists in providing the stem which has thus been made from the bent portion of the wire with an enlarged head or the like by means of which it is attached to a plaquet arm.

We are aware that it has heretofore been proposed to connect the plaquet with its arm by providing the plaquet at its end with an enlarged portion and the plaquet arm with a corresponding hole, the plaquet being connected with the arm merely by placing the arm with its hole over the enlarged end of the stem. However, this joint lacked the necessary accuracy, because the stems were not uniform in shape by reason of the method of manufacturing the same. Therefore the desired oscillating movement of the plaquet on its arm has not always been obtained.

The manner of manufacturing the plaquet will be understood from Figs. 5 to 10. The plaquet is made from a blank in the form of a short piece of wire of rectangular or square cross-section, and the said blank is first bent into the shape shown in Fig. 5 in which the blank comprises a double bend $d$ from which the stem is to be made, and outwardly directed shanks $e$ from which the flat portion of the plaquet is to be made. From the blank shown in Figs. 5 and 6 the blank shown in Figs. 7 and 8 is made by the second step of the method, the double bend $d$ which in Figs. 5 and 6 is open is pressed together into closed position thus producing a stem $d^1$. If desired the stem may be formed by the same operation with a transverse hole providing an eye by means of which the stem may be movably mounted on a pivot bolt of the frame of the eye-glasses or the like, for which purpose a suitable steel mandrel is placed into the open bend $d$, and the said bend is shaped around the said mandrel by pressing.

Figs. 9 and 10 illustrate the third step of the method which consists in pressing the shanks $e$ into flat portions $f$. Thus a plaquet is produced which is distinguished in shape from the shape shown in Figs. 1 and 2 insofar as in lieu of an oval flat portion $a$, two flat portions are provided which are connected with the stem $d^2$. This shape of the flat portions $f$, $f$ is preferred to the shape of the flat portion $a$ shown in Figs. 1 to 4, because the lining of celluloid or the like can be more intimately bound thereto.

We have found that the gilding of the stem is better than in the construction heretofore in use, because the stem $d^1$ is not subject to the drawing strain, so that its gilding is in a less degree subject to injury. Further, for bending the blank and compressing the bent portion thereof, and also for producing the flat portions $f$, $f$ less power is needed than in the manufacture of the plaquet shown in Figs. 1 to 4. Further, there is practically no waste of material.

In some cases the step illustrated by Figs. 7 and 8 may be dispensed with, in which case the bend $d$ is left open, as is shown in Fig. 5, because in such cases the shape of the stem is of minor importance. When the stem is U-shaped, as is shown in Fig. 5, the plaquet arm may be directly inserted into the slot of the stem, and this construction may be used when the plaquet is loosely jointed to the arm, or fixed to a transverse member by soldering.

Therefore our invention is not limited to the specific steps of the method, and the steps have been referred to only for illustrating the invention. The manufacture may also be made in another way, for example by directly bringing the blank shown in Figs. 5 and 6 into the shape shown in Figs. 9 and 10.

In the modification shown in Figs. 11 to 14 the stem $g$, which has been made, for example by the method described with reference to Figs. 5 to 10, from a bent wire, is provided with an enlarged head $h$. The distance between the said head $h$ and the lining $c$ of the plaquet is such that the arm $k$ which is formed with a corresponding hole $i$ and placed over the head $h$ of the stem has sufficient play between the said head and the lining $c$ so that the plaquet may oscillate on the arm.

In the modification shown in Figs. 15 and 16 the head is produced on the stem by forming grooves $m$ in the stem, the said grooves being engaged by the eye $n$ of the plaquet arm, which is formed internally with tapering walls. In this construction the play of the plaquet on the arm is uniform, and yet the parts cannot be disconnected from each other.

The dimensions of the stem and the eye of the arm are preferably such that it is possible to separate the parts from each other without applying excessive force.

We claim:

1. A method of manufacturing noncorrodible plaquets for spectacles or eye-glasses which consists in covering a wire with a noncorrodible material, such as gold, double-bending the wire at its mid-portion to form a stem, and flattening the end portions of the wire materially to reduce them in thickness whereby they are spread out and lie in a plane at right angles to the stem.

2. A method of manufacturing plaquets for eye-glasses which consists in doubling upon itself a wire, which is provided with a noncorrodible surface, bending the end portions of the wire outwardly, and pressing said end portions into a flat shape of substantially reduced thickness whereby the flattened end portions lie in a plane at substantially right angles to the stem portion, all without substantially injuring the noncorrodible surface.

3. A method of manufacturing plaquets for eye-glasses which consists in double-bending a blank in the form of a wire to produce a stem from its median bent portion, pressing the branches of the stem together and pressing the end portions of said wire into flat portions materially to reduce them in thickness whereby said end portions are spread out and lie in a plane at right angles to the stem.

4. A method of manufacturing non-corrodible plaquets for spectacles or eye-glasses which consists in covering a wire with a non-corrodible material, such as gold, double-bending the wire at its mid-portion to form a stem, and flattening the end portions of the wire materially to reduce them in thickness whereby they are spread out and lie in a plane at right angles to the stem, said stem being provided with oppositely arranged grooves for attachment of a plaquet arm thereto.

HANS ROLLBÜHLER.
WALTER DÖBBELIN.